(12) United States Patent
Nakamura

(10) Patent No.: US 7,083,092 B2
(45) Date of Patent: Aug. 1, 2006

(54) CASH REGISTERING APPARATUS AND SYSTEM, AND COMPUTER-READABLE RECORDING MEDIUM WHICH STORES A DISPLAY CONTROL PROGRAM FOR THE SAME APPARATUS THEREIN

(75) Inventor: Takashi Nakamura, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/902,839

(22) Filed: Aug. 2, 2004

(65) Prior Publication Data

US 2005/0211772 A1 Sep. 29, 2005

(30) Foreign Application Priority Data

Mar. 24, 2004 (JP) .............................. 2004-086607

(51) Int. Cl.
*G06K 15/00* (2006.01)
(52) U.S. Cl. ..................... 235/383; 235/385; 705/21; 705/28
(58) Field of Classification Search ................ 235/383, 235/385; 705/21, 28
See application file for complete search history.

(56) References Cited

U.S. PATENT DOCUMENTS 5,630,071 A * 5/1997 Sakai et al. ................. 705/21
5,712,989 A * 1/1998 Johnson et al. .............. 705/28
6,011,550 A * 1/2000 Capps et al. ................ 715/788
6,105,867 A * 8/2000 Shimizu et al. ............ 235/383

FOREIGN PATENT DOCUMENTS

| JP | HEI 10-188141 | 7/1998 |
| JP | HEI 11-96255 | 4/1999 |
| JP | 2000-353283 | 12/2000 |

* cited by examiner

*Primary Examiner*—Ahshik Kim
*Assistant Examiner*—Allyson N Trail
(74) *Attorney, Agent, or Firm*—Staas & Halsey LLP

(57) ABSTRACT

The present apparatus, when an operator alters registered transaction data thereon while referring to an issued receipt, makes it easy for him/her to find a target purchased item whose data is to be altered, thereby improving ease of operation and searchability. In response to a read-out instruction from the read-out instruction inputting unit, the corresponding transaction data is read from the storing unit. On the basis of the read-out transaction data and predetermined editing rules, a purchase specifics screen image is edited such that purchased items are arranged therein in the same order as the items are arranged on the printed receipt, and is then shown on the display unit. The apparatus is applicable as POS terminals installed in various types of shops and stores such as supermarkets and convenience stores.

20 Claims, 8 Drawing Sheets

FIG. 3

Receipt (200):
```
         SHOP NAME

COMMERCIAL MESSAGE
    COMMERCIAL MESSAGE

MONDAY, MAY 26, 2003   13:29

2580   CHEESE                        ¥300
IN2168 CIGARETTES                    ¥250
A1100  CHOCOLATE                     ¥120
A1100  COOKIES   ×2                  ¥240
       ¥120  ×2
×3  ¥300
"A" PACKAGE-SALE DISCOUNT  ×3        -¥60

SUBTOTAL    ×5                       ¥850
(TAX EXCLUSIVE AMOUNT TOTAL          ¥600)
TAX RATE OF 5.0%  CONSUMPTION TAX, ETC. ¥30
SUM TOTAL                          ¥880
OUT OF                           ¥1,000
CHANGE                             ¥120

CASHIER: 0001    FUJITSU TARO
R0001-#0627
```

| MENU ☒ | READ-OUT ACCORDING TO THE SERIAL NUMBER | | CHECKER | | 2003/5/26 | 13:30 | |
|---|---|---|---|---|---|---|---|
| | | | CASHIER | FUJITSU | POS 0001 | VO5L10 | |
| NO | ITEM | TAX TYPE | PRICE | QUANTITY | DISCOUNT | TOTAL | PAIR |
| 1 | CHEESE | EX | *** | 1 | | 300 | |
| 2 | CIGARETTES | IN | *** | 1 | | 250 | |
| 3 | CHOCOLATE | EX | *** | 1 | -20 | 100 | * |
| 4 | COOKIES | EX | *** | 2 | -40 | 200 | * |
| | | | | | | | |
| | | | | | | | |
| | | | | | | | |
| | | | | | | | |
| | | | | | | | |

FIG. 4

| | | SALE | | | CHECKER | | 2003/5/26 | 13:30 | |
| | | | | | CASHIER | FUJITSU | POS 0001 | VO5L10 | |

| MENU | ☒ | | | | | | | | |
|---|---|---|---|---|---|---|---|---|---|
| NO | ITEM | TAX TYPE | PRICE | QUANTITY | DISCOUNT | TOTAL | PAIR | | |
| 1 | CHEESE | EX | 300 | 1 | | 300 | | | |
| 2 | CIGARETTES | IN | 250 | 1 | | 250 | | | |
| 3 | CHOCOLATE | EX | 120 | 1 | −20 | 100 | * | | |
| 4 | COOKIES | EX | 120 | 2 | −40 | 200 | * | | |
| | | | | | | | | | |
| | | | | | | | | | |
| | | | | | | | | | |

FIG. 7

| | | | CHECKER | | 2003/5/26 | 13:30 | |
|---|---|---|---|---|---|---|---|
| MENU | OP | SALE | CASHIER | FUJITSU | POS 0001 | VO5L10 | |
| NO | ITEM | TAX TYPE | PRICE | QUANTITY | DISCOUNT | TOTAL | PAIR |
| 1 | CHOCOLATE | EX | 120 | 1 | -20 | 100 | * |
| 2 | CHEESE | EX | 300 | 1 | | 300 | |
| 3 | COOKIES | EX | 120 | 1 | -20 | 100 | * |
| 4 | CIGARETTES | IN | 250 | 1 | | 250 | |
| 5 | COOKIES | EX | 120 | 1 | -20 | 100 | * |
| | | | | | | | |
| | | | | | | | |

FIG. 8

```
┌─────────────────────────────────────────────┐
│  ┌───────────────────────────────────────┐  │
│  │             SHOP NAME                 │  │
│  └───────────────────────────────────────┘  │
│                                             │
│            COMMERCIAL MESSAGE           │
│            COMMERCIAL MESSAGE           │
│                                             │
│   MONDAY, MAY 26, 2003    13:29             │
│                                             │
│  ⎡ 2580     CHEESE                    ¥300  │
│  │ IN2168   CIGARETTES                ¥250  │
│  │  A1100   CHOCOLATE                 ¥120  │
│  │  A1100   COOKIES                         │
│  ⎣       ¥120    ×2                   ¥240  │
│   ×3   ¥300                                 │
│    "A" PACKAGE-SALE DISCOUNT   ×3    -¥60   │
│                                             │
│   SUBTOTAL    ×5                      ¥850  │
│   (TAX EXCLUSIVE AMOUNT TOTAL         ¥600 )│
│   TAX RATE OF 5.0%   CONSUMPTION TAX, ETC. ¥30 │
│   SUM TOTAL                        ¥ 8 8 0  │
│   OUT OF                         ¥ 1, 0 0 0 │
│   CHANGE                           ¥ 1 2 0  │
│                                             │
│   CASHIER: 0001     FUJITSU TARO            │
│   R0001-#0627                               │
└─────────────────────────────────────────────┘
```
200

CASH REGISTERING APPARATUS AND SYSTEM, AND COMPUTER-READABLE RECORDING MEDIUM WHICH STORES A DISPLAY CONTROL PROGRAM FOR THE SAME APPARATUS THEREIN

BACKGROUND OF THE INVENTION

1. Field of the Invention

The present invention relates to a technique for displaying purchase specifics (transaction information) on a cash registering apparatus such as a POS (Point of Sales) terminal installed in various types of shops and stores such as supermarkets and convenience stores. The invention particularly relates to a display method suitable for use when an operator alters transaction information stored in the cash registering apparatus, referring to an issued receipt, as requested by a customer.

2. Description of the Related Art

Generally speaking, various types of shops and stores such as supermarkets and convenience stores install POS systems (cash registering systems). When purchased items are returned or replaced in response to customers' requests, it is possible for an operator of such a POS system to alter (when adding, replacing, and returning items) transaction information already registered therein, referring to the information printed on an issued receipt (for example, see Japanese Patent Application Publication Nos. HEI 10-188141, HEI 11-096255, and 2000-353283).

When such a transaction alteration is made by an operator on the POS terminal under request from a customer, the operator inputs the POS number and the receipt serial number printed on a receipt which is brought by the customer. Upon input of the information, purchase specifics information (also called transaction information, transaction data) corresponding to the information printed on the receipt is read from a storage unit of the POS terminal or the POS system and is shown on the screen of a main display of the POS terminal. Comparing the read-out registered purchase specifics shown on the main display and the information printed on the receipt, the operator makes necessary alteration (adding, replacing, returning items) to the transaction information on the POS terminal.

At the time of a normal transaction (check out at a check out counter) made on the POS terminal, barcodes of commodity items purchased are read with a scanner, and a database is searched for commodity information [item name, price, discount information, and Bundle Mix Pair match (hereinafter abbreviated as "BMP") item information] corresponding to the obtained barcode information (commodity code) to retrieve the information.

Here, as shown in FIG. 7, commodity items purchased are arranged on the main display (a display screen for an operator) of the POS terminal in the order in which the barcodes of the purchased items were read by the operator, and the purchased items are registered in the same order (the order of barcode reading) into a storage unit (storing unit) of the POS terminal and the POS system.

After completion of reading the barcodes of all the purchased items, the check out is completed with payment for the purchase, and a receipt is printed/issued to be handed to the customer.

In the information printed on the receipt, the purchased items are normally arranged not in the order of barcode reading as shown in FIG. 7 but in the order such that the purchase specifics stored in the storage unit of the POS terminal or the POS system are edited in a predetermined manner. For instance, the following are example rules applied to the editing process.

(1) Information of items with input errors (reading errors) should not be printed;

(2) transaction data should be sorted according to commodity categories before printing;

(3) if two or more of the same commodity item are separately read and registered, transaction data thereof should be sorted together to print as one piece of transaction data, and the quantity of the commodity item purchased should also be printed; and (4) if BMP items (with a package price) are separately read and registered, specifics (transaction data) thereof should be printed and/or displayed consecutively, and an amount of discount for the package should also be printed.

For instance, assuming that purchase specifics of commodity items are registered and shown on the main display in the order indicated in FIG. 7, the purchase specifics are edited according to the above rules (1) through (4), and printed on a receipt 200 as shown in FIG. 8. FIG. 7 shows a screen image shown on the main display when data is read/registered from chocolate, cheese, cookies, cigarettes, and cookies in this order. In this example, two packets of cookies are separately read/entered, and both the chocolate and the cookies are BMP items, any three of which purchased at the same time allow a discount of ¥60, from ¥360 to ¥300, as a whole.

In the receipt 200 of FIG. 8 printed/issued after the items are read/entered in the order shown in FIG. 7, the chocolate and the cookies, which are BMP items, are printed as a BMP group below the specifics of the cheese and the cigarettes. At the end of the receipt 200 are printed a POS number ("0001" in FIG. 8) and a transaction serial number ("0627" in FIG. 8), which is assigned in sequence to every transaction made on the POS terminal. In addition, in the storage unit, the purchase specifics (transaction data) of the commodity items purchased are associated with the POS number and the transaction serial number.

If any alteration needs to be made to the transaction information corresponding to the information printed on the receipt 200 after its issuance, the POS number and the transaction serial number printed on the receipt 200 are input to read the purchase specifics information corresponding to the information printed on the receipt from the storage unit to show the information on the main display of the POS terminal. Here, since the information read from the storage unit is shown on the main display without undergoing any editing processing, purchased items are arranged on the screen image in the order their barcodes are read by the operator, as in the case of normal transaction (check out at a check out counter) of FIG. 7.

Accordingly, when any changes are made to the transaction information corresponding to the information printed on a receipt, an operator has to compare the purchase specifics of FIG. 7 shown on the main display with the information of FIG. 8 printed on the receipt to perform alteration on the POS terminal.

At this time, since the information printed on the receipt has undergone the aforementioned editing process, the transaction data (display format) shown on the main display, which data is arranged in the order of barcode reading, differs from the transaction data (print format) printed on the receipt in the order in which purchased items are arranged and also in the number of lines printed/displayed. In such a case, it takes time for the operator to find a target item on the main display, so that ease of operation and searchability deteriorate.

Moreover, the difference between the display format and the print format increases the possibility that an operator will choose a wrong item with a similar item name to the target item, so that the erroneous operation is more likely to happen.

SUMMARY OF THE INVENTION

With the foregoing problems in view, it is an object of the present invention to make it easy for an operator to find target items when he/she makes alteration to registered transaction data, as requested by a customer, while referring to an issued receipt, so that ease of operation and searchability are improved. This will lower the possibility that an operator erroneously chooses a wrong item, thereby preventing occurrence of operation error with reliability.

In order to accomplish the above object, according to the present invention, there is provided a cash registering apparatus, comprising: a commodity code obtaining unit for obtaining a commodity code of each commodity item purchased; a retrieving unit for retrieving commodity information corresponding to the commodity code obtained by the commodity code obtaining unit; a registering unit for registering, as transaction data, the commodity information retrieved by the retrieving unit; a first editing unit for editing, upon completion of check out of the commodity item, print information to be printed on a receipt, based on a predetermined editing rule and the transaction data registered by the registering unit; a receipt issuing unit for issuing the receipt, on which the print information edited by the first editing unit is printed; a display unit for showing on a screen thereof various kinds of data relating to transaction of the commodity item purchased; a display controlling unit for controlling a display condition on the screen; a read-out instruction inputting unit for inputting a read-out instruction for reading the registered transaction data corresponding to the issued receipt; a read-out unit for reading the registered transaction data in response to the read-out instruction input from the read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by the read-out unit, the display controlling unit controlling the display unit to show on the screen thereof the purchase specifics screen image edited by the second editing unit.

As a preferred feature, as an initial step, the second editing unit edits a simplified screen image, on which the print information is briefly shown, as the purchase specifics screen image, and the display controlling unit controls the display unit to show on the screen thereof the simplified screen image, and as the next step, the second editing unit edits and restores a full screen image, on which the print information is fully shown, as the purchase specifics screen image, and the display controlling unit controls the display unit to show on the screen thereof the full screen image.

As a generic feature, there is provided a cash registering system, comprising: a commodity information database storing commodity information of each commodity item and commodity code of the commodity item in association with each other; a commodity code obtaining unit for obtaining a commodity code of each commodity item purchased; a retrieving unit for retrieving, from the commodity information database, commodity information corresponding to the commodity code obtained by the commodity code obtaining unit; a storing unit for storing transaction data therein; a registering unit for registering and storing, as the transaction data, the commodity information retrieved by the retrieving unit in the storing unit; a first editing unit for editing, upon completion of check out of the commodity item, print information to be printed on a receipt, based on a predetermined editing rule and the transaction data registered and stored in the storing unit by the registering unit; a receipt issuing unit for issuing the receipt, on which the print information edited by the first editing unit is printed; a display unit for showing on a screen thereof various kinds of data relating to transaction of the commodity item purchased; a display controlling unit for controlling a display condition on the screen; a read-out instruction inputting unit for inputting a read-out instruction for reading the registered transaction data corresponding to the issued receipt from the storing unit; a read-out unit for reading the registered transaction data from the storing unit in response to the read-out instruction input from the read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read from the storing unit by the read-out unit, the display controlling unit controlling the display unit to show on the screen thereof the purchase specifics screen image edited by the second editing unit.

As another generic feature, there is provided a computer-readable recording medium which records therein a display control program for a cash registering apparatus including the aforementioned commodity code obtaining unit, retrieving unit, registering unit, first editing unit, receipt issuing unit, and display unit, the display control program instructing a computer to function as a display controlling unit for controlling a display condition on the display unit. The display control program instructs the computer to function as the following: a read-out unit for reading, in response to a read-out instruction for reading the registered transaction data corresponding to the issued receipt, the registered transaction data; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by the read-out unit, and the display control program also instructs the computer to control the display unit to show on the screen thereof the purchase specifics screen image edited by the second editing unit.

The present invention guarantees the following advantageous results. When an operator alters registered transaction data as requested by a customer, while referring to an issued receipt, a purchase specifics screen image is edited such that items purchased are arranged therein in the same order that the items are arranged in a printed receipt, and the purchase specifics screen image is then shown on the display unit of the cash registering apparatus. That is, since the registered transaction data is arranged in a screen image shown on the display unit of the cash registering apparatus in the same order that the items purchased are arranged in the information printed on the receipt, it is easy for the operator to find a target item in the screen image shown on the display unit, so that ease of operation and searchability are greatly improved. This facilitates adding, replacing, and returning commodity items as desired by customers, thereby improving customer convenience.

Further, since the registered transaction data is arranged in a screen image shown on the display unit of the cash registering apparatus in the same order that the items purchased are arranged in the information printed on the receipt, it is possible to minimize the possibility that the operator will choose a wrong item shown on the display unit because of its item name being similar to that of a target item, thereby preventing occurrence of erroneous operation by the operator with certainty.

Other objects and further features of the present invention will be apparent from the following detailed description when read in conjunction with the accompanying drawings.

BRIEF DESCRIPTION OF THE DRAWINGS

FIG. 3 is a view showing an example of a purchase specifics screen image (simplified screen image) which is displayed on the POS terminal at data-reading performed according to a given transaction serial number, together with an example of a receipt corresponding to the purchase specifics;

FIG. 4 is a view showing another example of a purchase specifics screen image (full screen image) which is displayed on the POS terminal at restoration of the purchase specifics;

FIG. 7 is a view showing an example of a purchase specifics screen image displayed on the POS terminal at normal sales transactions; and FIG. 8 is an example of a receipt issued on the basis of the information shown in the purchase specifics screen image of FIG. 7.

DESCRIPTION OF THE PREFERRED EMBODIMENT

One preferred embodiment of the present invention will be described hereinbelow with reference to the accompanying drawings.

[1] One Preferred Embodiment

Figure 1:
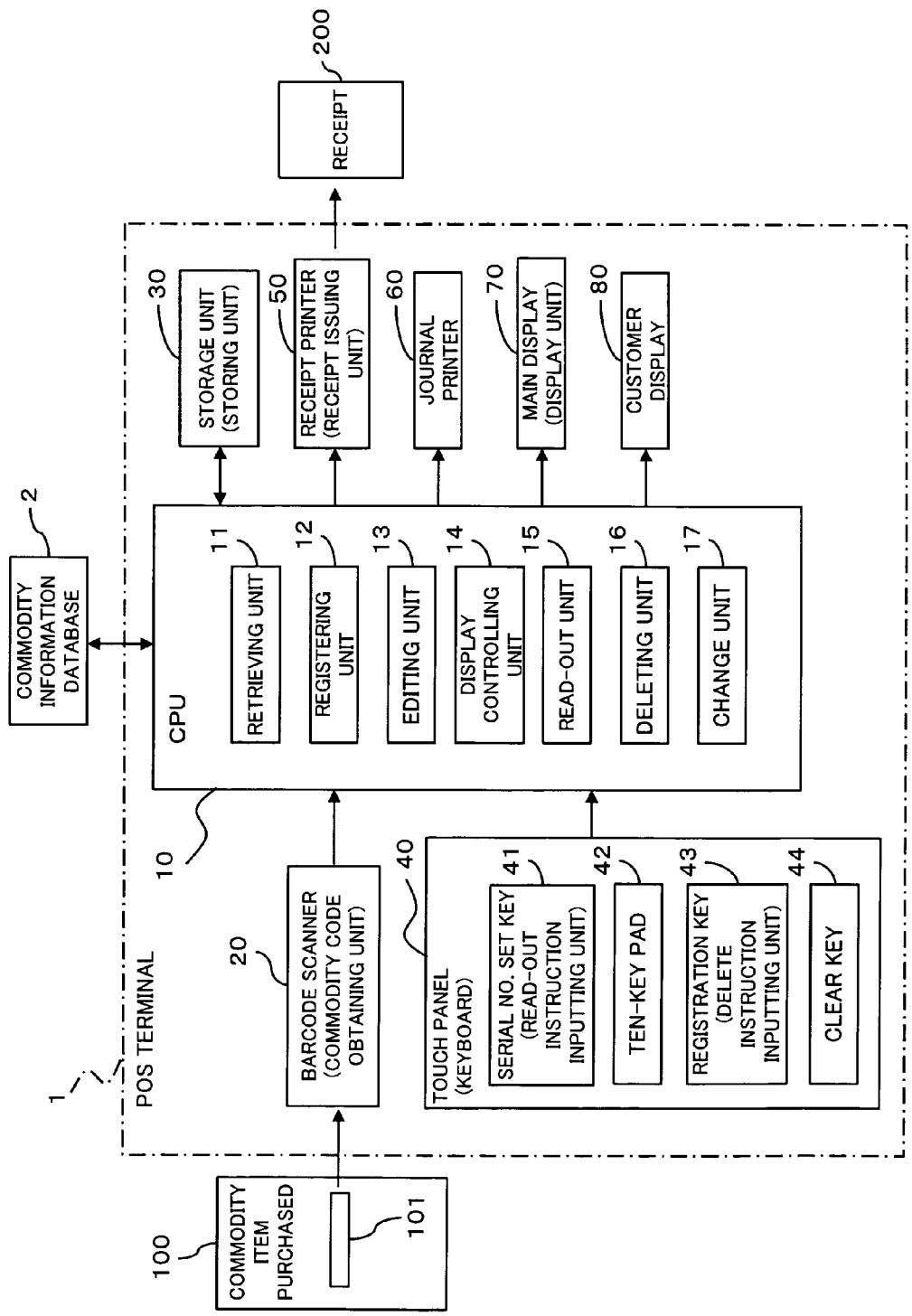
FIG. 1 is a block diagram showing a functional construction of a cash registering system (POS system) including a cash registering apparatus (POS terminal) according to one preferred embodiment of the present invention.

FIG. 1 is a block diagram showing a functional structure of a cash registering system (POS system) including a cash registering apparatus (POS terminal) according to one preferred embodiment of the present invention. As shown in FIG. 1, a POS terminal (cash registering apparatus) 1 of the present embodiment, which has a CPU 10, a barcode scanner 20, a storage unit 30, a touch panel 40, a receipt printer 50, a journal printer 60, a main display 70, and a customer display 80, is connected to a commodity information database 2.

The commodity information database 2 stores therein commodity information (for example, item names, prices, discount information, BMP item information, and so on) of various commodity items on sale at a shop or store in which the POS terminal 1 is installed, and also the commodity codes of those commodity items in association with each other. The commodity information database 2 is connected to the POS terminal 1 so as to be accessible from the POS terminal 1 directly or indirectly via a network such as a LAN (Local Area Network). Generally speaking, such a commodity information database 2 is shared by more than one POS terminal 1. With only one POS terminal 1 included in the POS system, the commodity information database 2 can be provided within the POS terminal 1.

The barcode scanner (commodity code obtaining unit) 20 reads barcode information from the barcode 101 provided for the commodity item 100, to obtain the commodity code of a commodity item 100.

The storage unit (storing unit) 30 is realized by a storage device such as a RAM and a hard disc contained in the POS terminal 1. As will be described later, transaction data is entered (registered)/reentered in the storage unit 30 at sale or after any alternation made to the transaction data. The storage unit 30 stores individual pieces of transaction data in association with their transaction identifying information that identifies the individual pieces of transaction data. Concretely, the transaction identifying information is, for example, a POS number (apparatus number) unique to a POS terminal 1 on which each transaction is processed and a transaction serial number given to the transaction, such transaction serial numbers being sequentially assigned to transactions in the order in which the transactions are performed. Although the POS terminal 1 of the present embodiment uses its built-in storage device as the storage unit 30, an external storage device can also serve as the storage unit 30. In such cases, like in the foregoing commodity information database 2, the external storage device, which serves as the storage unit 30, is connected to the POS terminal 1 so as to be accessible from the POS terminal 1 directly or indirectly via a network such as a LAN (Local Area Network), and is shared by more than one POS terminal 1. Here, with only one POS terminal 1 included in the POS system, a transaction serial number alone is sufficient as the transaction identifying information.

The touch panel (keyboard) 40 has various key functions: a serial number set key 41, a ten-key pad 42, a registration key 43, a clear key 44, and so on, and an operator presses such keys, thereby inputting various kinds of instructions and numerical values to the POS terminal 1 (CPU 10).

The serial number set key 41 functions as a read-out instruction inputting unit that inputs a read-out instruction to the CPU 10 for reading from the storage unit 30 transaction data corresponding to the information printed on an issued receipt 200. More precisely, when the necessity arises to alter registered transaction data with reference to an issued receipt 200 under a customer's request, an operator presses the serial number set key 41, thereby making a read-out instruction to the commodity item 100 such that registered transaction data (past data) corresponding to the information printed on the issued receipt 200 is read out from the storage unit 30.

The ten-key pad 42 is used by an operator to input therethrough various kinds of numerical values to the CPU 10. In the present embodiment, the ten-key pad 42 is used to input transaction identifying information (the foregoing POS numbers and transaction numbers) printed on an issued receipt 200 to the CPU 10 after inputting of the read-out instruction with the serial number set key 41.

The registration key 43 is used by an operator, when he/she inputs numerical values with the ten-key pad 42, to confirm the entry. After making an entry of a numerical value with the ten-key pad 42, the operator presses the registration key 43, the input value being thereby confirmed and entered into the CPU 10. In addition, as will be detailed later, the registration key 43 also serves as a delete instruction inputting unit that inputs to the CPU 10 a delete instruction, after a simplified screen image (see FIG. 3) is shown on a main display 70 (see step S20 of FIG. 2), to delete from the storage unit 30 transaction data corresponding to the information shown in the simplified screen image.

The clear key 44 is used by an operator, after making any input with the ten-key pad 42 or any other keys, to cancel the entry.

The receipt printer (receipt issuing unit) 50, controlled by the CPU 10, issues a receipt 200 at sale, on which receipt is printed information (see, for example, FIG. 8) edited by an editing unit 13 (will be detailed later).

The journal printer 60, controlled by the CPU 10, records a history of transactions and operations made on the POS terminal 1, by printing the information about the transactions and operations on a journal paper (not illustrated) every time a transaction or an operation is performed.

The main display (display unit) 70, controlled by the CPU 10 (display controlling unit 14; detailed later), shows on its screen various kinds of data relating to trade of commodity items 100 for the use of an operator. At the time of sale (see step S11 of FIG. 2), the main display 70 of the present embodiment shows such a purchase specifics screen image as is shown in FIG. 7, whereas at the time of data reading according to an input serial number (see step S20 of FIG. 2), the main display 70 shows such a purchase specifics screen image (simplified screen image) as is shown in FIG. 3, and then shows another purchase specifics screen image (full screen image) which is to be displayed after restoration of the purchase specifics (see step S25 of FIG. 2).

The customer display 80, controlled by the CPU 10 (display controlling unit 14; detailed later), shows on its screen various kinds of data relating to trade of commodity items 100 for customers.

The CPU 10 manages the whole POS terminal 1 in an integrated manner. In the present embodiment, the CPU 10 executes a predetermined application program (display controlling program for cash registering apparatus), as will be detailed later, thereby performing the functions of a retrieving unit 11, a registering unit 12, an editing unit 13, a display controlling unit 14, a read-out unit 15, a deleting unit 16, and a change unit 17.

The retrieving unit 11 retrieves from the commodity information database 2 commodity information corresponding to each commodity code (barcode information) read by the barcode scanner 20.

The registering unit 12 registers and stores the commodity information, which is retrieved from the commodity information database 2 by the retrieving unit 11, in the storage unit 30 in the same order that the barcode scanner 20 obtains such commodity codes. At that time, as already described, the transaction data is stored in the storage unit 30 in association with the POS number of the POS terminal 1 on which the transaction was processed and the transaction serial number uniquely assigned to every transaction processed on the POS terminal 1. In addition, the registering unit 12 has also a function of registering and storing in the storage unit 30 transaction data altered by the change unit 17.

The editing unit 13 doubles as a first and a second editing unit (will be detailed later). That is, on the CPU 10 (editing unit 13) of the present embodiment, the function of the first editing unit also realizes the function of the second editing unit.

The function as the first editing unit of the editing unit 13 is an ordinary function conventionally given to such an editing unit, that is, the function of editing, upon completion of check out of a commodity item 100 at sale, print information to be printed on a receipt, based on predetermined editing rules and transaction data registered and stored in the storage unit 30 by the registering unit 12. More precisely, as already described with reference to FIG. 7 and FIG. 8, the print information to be printed on a receipt 200 by the receipt printer 50 is edited by the function of the first editing unit, editing the transaction data registered and stored in the storage unit 30 according to the predetermined editing rules as shown in FIG. 8. The following are example editing rules similar to the above described editing rules.

(1) Information of items with input errors (reading errors) should not be printed;

(2) transaction data should be sorted according to commodity categories before printing;

(3) if two or more of the same commodity item are separately read and registered, transaction data thereof should be sorted together to print as one piece of transaction data, and the quantity of the commodity item purchased should also be printed; and (4) if BMP items, which are on sale as a package, are separately read and registered, transaction data thereof should be printed and/or displayed consecutively, and an amount of discount for the package should also be printed.

Further, the editing unit 13 as the first editing unit edits information to be printed on a receipt in such a manner that a POS number and a transaction serial number are printed as transaction identifying information at the end of the receipt 200.

The function of the editing unit 13 as the second editing unit is characteristic of the present invention. At alteration of transaction data, the editing unit 13 edits a purchase specifics screen image (a simplified and a full screen image) such that commodity items purchased are arranged on the purchase specifics screen image in the same order that the commodity items are arranged in print information printed on the receipt, based on the above-listed predetermined editing rules (1) through (4) and transaction data read from the storage unit 30 by the read-out unit 15 (will be detailed later). Here, the editing unit 13, as the second editing unit, firstly edits a simplified screen image (see FIG. 3), on which simplified print information is shown, as a purchase specifics screen image, and then, in response to a delete instruction from the registration key 43, the editing unit 13 edits/restores a full screen image (see FIG. 4), on which the print information is fully shown, as a purchase specifics screen image.

The display controlling unit 14 controls display conditions of the main display 70 and the customer display 80. In particular, at alteration of transaction data, the display controlling unit 14 controls the display condition of the main display 70 in the following manner in the present embodiment. The display controlling unit 14 firstly controls the main display 70 to show on its display screen a simplified screen image (see FIG. 3) edited by the editing unit (second editing unit) 13 as a purchase specifics screen image, and then controls the main display 70, in response to a delete instruction from the registration key 43, to show a full screen image (see FIG. 4) edited by the editing unit (second editing unit) 13 as a purchase specifics screen image.

The read-out unit 15 reads transaction data stored in the storage unit 30, in response to a read-out instruction from the serial number set key 41. On the basis of a POS number and a transaction serial number input through the ten-key pad 42, the read-out unit 15 reads out transaction data associated with the POS number and the transaction serial number.

The deleting unit 16 deletes such transaction data read from the storage unit 30, in response to a delete instruction from the registration key 43.

The change unit 17 performs a desired change operation to such registered transaction data shown in a full screen image on the main display 70, in response to a change instruction, which is made by an operator with the touch panel 40 or the like while referring to the full screen image shown on the main display 70. As described above, after being changed by the change unit 17, the transaction data is registered/stored anew in the storage unit 30 by means of the registering unit 12.

Next, the process of serial number deletion/correction (change of registered transaction data) performed in the POS terminal 1 of the present embodiment will be described hereinbelow with reference to FIG. 2 through FIG. 8. Note that the "serial number correction" is defined in this description as the process of reading past transaction data by using its serial number (the POS number and the transaction serial number in this example) as a key and correcting any input errors (quantity, discount amount, and so on) and/or making any changes in the data according to a customer's request.

Figure 2:
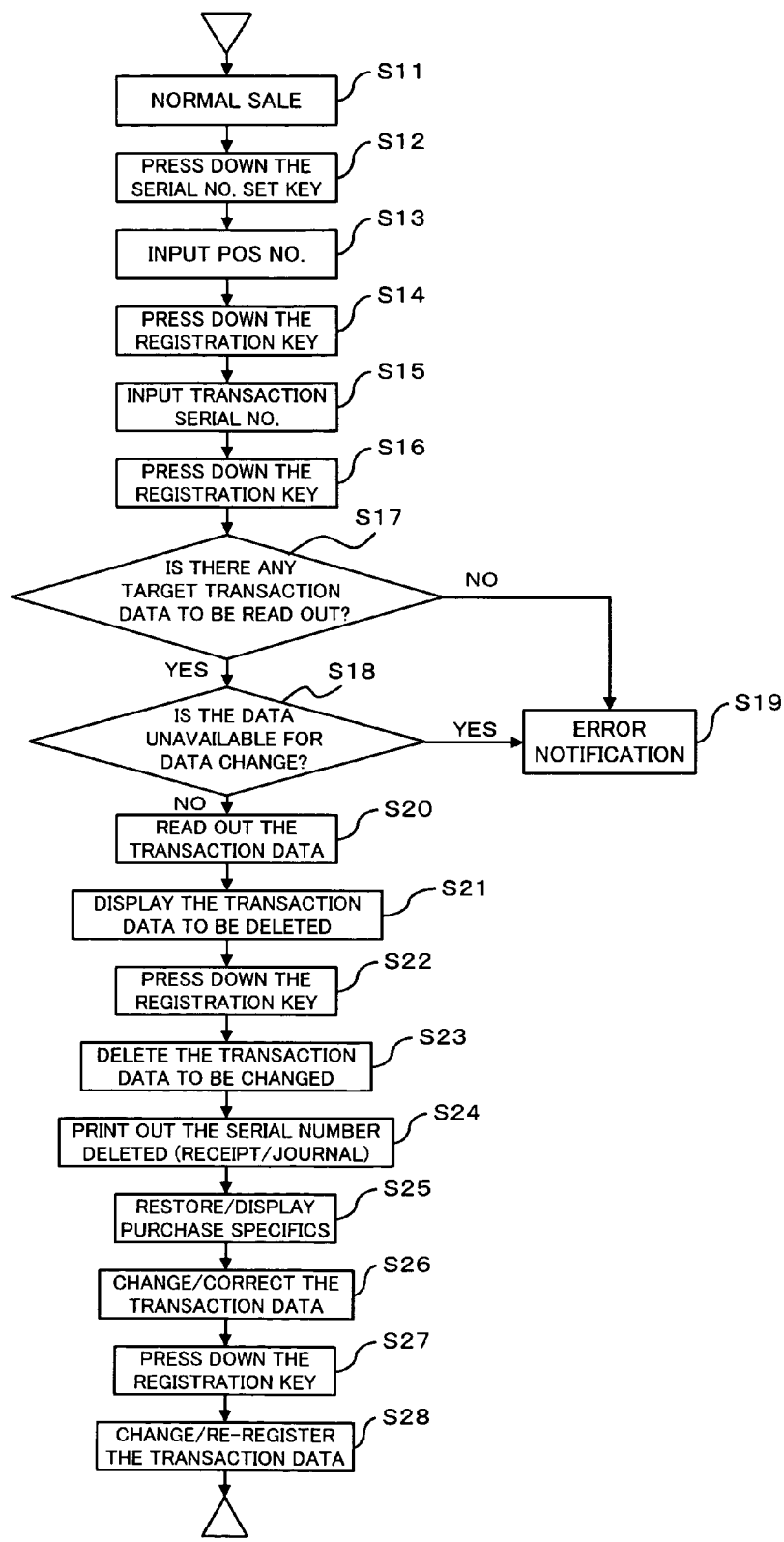
FIG. 2 is a view indicating an operation flow at serial number deletion/correction (at alteration of registered transaction data)

FIG. 2 shows an operation flow of the serial number deletion/correction performed on the POS terminal 1, or an operation flow of registered transaction data alteration. In accordance with the operation flow (steps S11 through S28) of FIG. 2, the procedures of making a change in registered transaction data will be described hereinbelow. In FIG. 2, steps S12 through S16, S22, S26, and S27 are instructing/inputting steps that are executed by an operator through the touch panel 40, and steps S17 through S21, S23 through S25, and S28 are processing steps that are performed on the POS terminal 1.

First of all, at sale, where check out of purchases (commodity items 100) is performed (step S11), an operator at the POS terminal 1 uses the barcode scanner 20 to read the barcode 101 provided for each commodity item 100. On the basis of the thus-obtained barcode information (commodity information), the retrieving unit 11 searches the commodity information database 2 for commodity information (item name, price, discount information, BMP item information, and so on) corresponding to the barcode 101, and reads the commodity information from the commodity information database 2. At this time, on the main display 70 of the POS terminal 1, specific information (transaction data) of the commodity items 100 purchased is arranged in the order their barcodes are read by the operator, as shown in FIG. 7, for example, and the information is registered in the storage unit 30 in the same order (the order of barcode reading).

Figure 5:
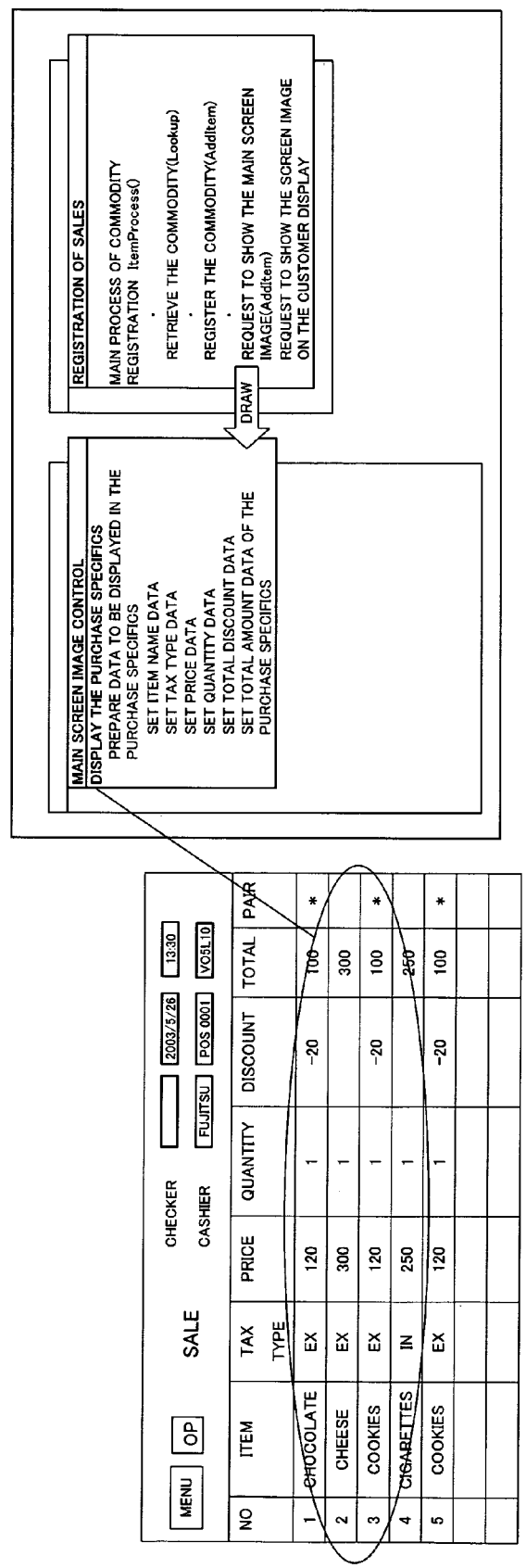
FIG. 5 is a view for describing functions of the POS terminal for registering a sales transaction at sale and also for controlling a main screen image shown on the POS terminal.

FIG. 5 is a view for describing a function (the functions of retrieving unit 11 and registering unit 12) of the POS terminal 1 (CPU 10) of entering sales transaction data at sale and also a function (the function of display controlling unit 14) of the POS terminal 1 of controlling a main screen image shown on a screen thereof. As main processing for item registration [Item Process ( )], the CPU 10 executes commodity retrieving (Lookup) and commodity registering (AddItem), and requests to show a main screen image (AddItem) and to show the screen image on a customer display, as shown in FIG. 5. The main screen image display request is issued to the display controlling unit 14 so as to have the specific information of each commodity item 100 be shown on the main display 70 on every reading of commodity item 100. Upon receipt of the main screen image display request, the display controlling unit 14 creates/draws data to be displayed as a registration specifics screen image, based on the result (commodity information) of commodity retrieving, and controls the main display 70 to show the commodity registration specifics (see FIG. 5 and FIG. 7) thereon. As such data to be displayed as a registration specifics screen image, the following data are set/created: item name; tax type; price; quantity; discount amount total; subtotal of each item purchased.

After barcodes 101 are read from all the purchased commodity items 100, payment for the purchases is performed, thereby completing the check out. The receipt printer 50 prints/issues a receipt 200, which is then handed to the customer, whereby the sale (step S11) is completed.

Here, the items printed on the receipt 200 are arranged in a different order from the one (FIG. 7) in which their barcodes 101 were read by an operator. In the information printed on the receipt 200, transaction data of each commodity item 100 stored in the storage unit 30 is edited in accordance with the foregoing editing rules (1) through (4). That is, as already described, assuming that transaction data of the commodity items 100 is entered in the order shown in FIG. 7 and shown on the main display 70 in the same order, the data of the chocolate and cookies, which are BMP items, are sorted/grouped and printed on the receipt 200 in an organized manner below the data of the cheese and cigarettes, as shown in FIG. 8. In addition, at the end of the receipt 200 are printed the POS number ("0001" in FIG. 8) of the POS terminal 1 on which the transaction was performed and also a transaction serial number ("0627" of FIG. 8), which is sequentially given to every transaction made on the POS terminal 1 in the order the transaction was performed.

After issuance of the receipt 200, if any change is made to the transaction data recorded on the receipt 200, that is, the transaction data registered in the storage unit 30, the following procedures are performed. Upon receipt of such request of data changing from a customer, an operator presses the serial number set key 41 of the touch panel 40, thereby inputting a read-out instruction to the CPU 10 to read from the storage unit 30 transaction data corresponding to the information printed on the receipt 200 (step S12).

When the operator presses the serial number set key 41, a guidance screen image (not shown), through which transaction identifying information (POS number and transaction serial number) is to be input, is shown on the main display 70. Following the instruction of the guidance screen image, the operator uses the ten-key pad 42 and the registration key 43 to input the transaction identifying information (steps S13 through S16).

At this time, the operator firstly uses the ten-key pad 42 to input the POS number printed on the receipt 200 (step S13), and confirms the input POS number by pressing the registration key 43 (step S14). If the POS number input at step S13 needs to be corrected/changed, the operator presses the clear key 44, and inputs the POS Number anew using the ten-key pad 42.

After confirming the POS number, the operator uses the ten-key pad 42 to input the transaction number printed on the receipt 200 (step S15), and presses the registration key 43 to confirm the input transaction serial number (step S16). If the transaction number input at step S15 needs to be corrected/changed, the operator presses the clear key 44, and inputs the transaction serial umber anew using the ten-key pad 42.

In the POS system including more than one POS terminal 1, since it is required to recognize on which POS terminal 1 the subject transaction data was registered so as to read therefrom the transaction data corresponding to the information printed on the receipt 200, POS numbers assigned, one to each POS terminal 1, are employed as transaction identifying information. However, in a POS system with no need to identify the POS terminal, for example, in a POS system including only one POS terminal 1, steps S13 and S14 of inputting a POS number can be omitted. In that case, there appears on the main display 70 a guidance screen image encouraging an operator to input only a transaction serial number.

After such inputting of the transaction identifying information (POS number and transaction serial number), the CPU 10 (read-out unit 15) evaluates whether or not the transaction data (transaction data to be read out) specified by the input transaction identifying information is stored in the storage unit 30 of the POS terminal 1 or that of another POS terminal 1 (step S17). If the evaluation result is positive (YES route of step S17), the CPU 10 then evaluates whether or not the to-be-read-out transaction data is unavailable for data change (data of cancelled or returned items, for example) (step S18). If the to-be-read-out transaction data is not stored in the storage unit 30 (NO route of step S17), or if the data is unavailable for data change (YES route of step S18), an error notification is sent to the operator through the main display 70 (step S19).

If the to-be-read-out transaction data is stored in the storage unit 30 (YES route of step S17) and also if the data is available for data change (NO route of step S18), the read-out unit 15 reads from the storage unit 30 transaction data associated with the input transaction identifying information (registered transaction data corresponding to the information printed on the printed receipt 200) (step S20). At this time, if the object registered transaction data is stored in the storage unit 30 of another POS terminal 1, the data will be read from the storage unit 30 of the last-mentioned POS terminal 1 via a network or the like.

After that, the registered transaction data read from the storage unit 30 by the read-out unit 15 is edited by the editing unit 13 according to the foregoing editing rules (1) through (4), and the display controlling unit 14 controls the main display 70 to show on its display screen a purchase specifics screen image (see FIG. 3) where transaction data is arranged in the same order as the transaction data is arranged on the printed receipt 200. That is, the transaction data to be deleted from the storage unit 30 (to-be-deleted transaction) is temporarily shown on the main display 70 in a simplified form (step S21).

As shown in FIG. 3, the purchase specifics screen image shown at the step S21 is a simplified screen image in which all the price data is expressed as "***". In accordance with the foregoing editing rules (1) through (4), the transaction data is arranged in this simplified screen image in the same order as the data is printed on the receipt 200, and BMP items are grouped. Further, for the purpose of restoring/displaying the purchase specifics (transaction data) at step S25 (detailed later), a restoration list that lists transaction data of the items purchased in the same order as the data is printed on the receipt 200 is created. FIG. 3 shows an example of a printed receipt 200 and a simplified screen image that is shown on the main display 70 of the POS terminal 1 when registered data corresponding to the printed receipt 200 is read out using the serial number printed thereon as a key.

Figure 6:
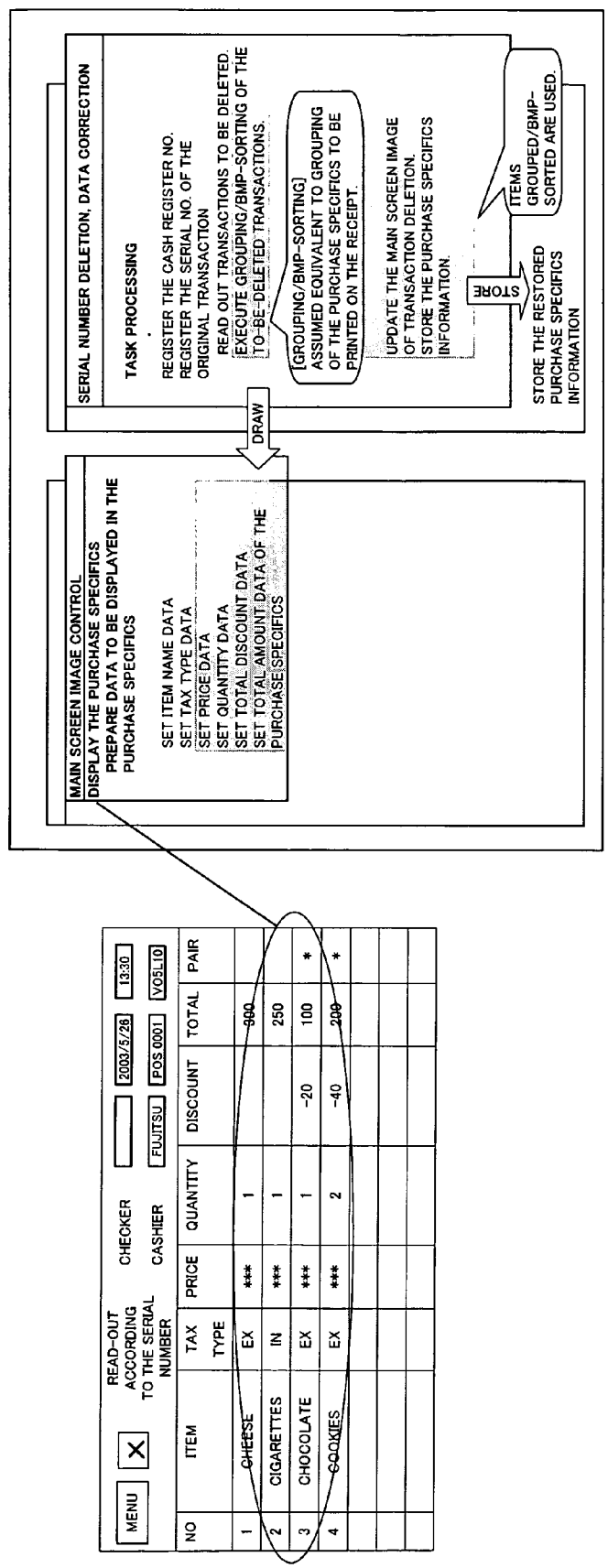
FIG. 6 is a view for describing functions of the POS terminal for deleting/correcting transaction data at serial number deletion/correction and also for controlling a main screen image shown on the POS terminal.

Here, FIG. 6 is a view for describing a function (of the editing unit 13, the read-out unit 15, and the deleting unit 16) of the POS terminal 1 (CPU 10) of deleting/correcting transaction data at serial number deletion/correction and also a function (of the display controlling unit 14) of the POS terminal 1 of controlling a main screen image shown on the POS terminal. As shown in FIG. 6, receiving a POS number (POS number input; steps S13 and S14) and an original transaction serial number (transaction serial number input; steps S15 and S16), the CPU 10 reads out transaction data to be deleted (reading of registered transaction data; steps S17 through S20). Then, after the editing unit 13 performs grouping and/or BMP-sorting processing on the to-be-deleted transaction data (that is, registered transaction data), the main screen image of the to-be-deleted transaction is updated. Such grouping and BMP-sorting processing are equivalent to the processing (grouping and BMP-sorting processing performed on the information to be printed on the receipt) performed at issuance of the receipt 200.

Such grouping processing will be detailed hereinbelow. The grouping processing is to edit transaction data in such a manner that two or more pieces of purchase information (including information about individual items such as a discount amount) of the same commodity item are grouped into one for print/display. The transaction data to be grouped is, for example, the following items (a) through (c); the transaction data not to be grouped is, for example, the following items (d) and (e).

(a) Data of each separate item (transaction data obtained by scanning barcode 101 of commodity item 100) is to be grouped.

(b) Transaction data of discount (manual discount/automatic discount) items with the same discount method (manual discount/automatic discount) and the same discount amount is to be grouped.

(c) Transaction data of price changeable items whose prices after being changed are the same is to be grouped.

(d) Transaction data of BMP items and package sale items is not to be grouped (note that transaction data of such BMP items are subjected to BMP-sorting).

(e) Transaction data with decimal places input (sold by weight) is not to be grouped.

The registered transaction data (transaction specifics) read out from the storage unit 30 is stored as data for purchase specifics restoration, and the aforementioned restoration list is created. At the aforementioned updating of the main screen image of the to-be-deleted transaction or the aforementioned storing of the transaction specifics, items having undergone grouping/BMP-sorting are used.

An instruction to update the to-be-deleted transaction main screen image is given to the display controlling unit 14. From the result of grouping/BMP-sorting by the editing unit 13, the display controlling unit 14 creates/draws display data of the registered purchase specifics such that transaction data is arranged in the same order as in the printed information on the receipt 200 of FIG. 8, and controls the main display 70 to show on its screen the registered purchase specifics (simplified purchase specifics screen image; FIG. 3 and FIG. 6). At this time, in the registered purchase specifics (simplified purchase specifics screen image), all the price data is described as "***".

Referring to such registered purchase specifics (simplified purchase specifics screen image) shown on the main display 70, the operator checks the information shown on the display 70 against the information printed on the receipt 200. If the read-out transaction data is found to be target data to be changed (the same information as that printed on the receipt 200), the operator presses the registration key 43 (step S22). On the other hand, if the read-out data is not target data, the operator presses the clear key 44 and then terminates the processing or reinputs a POS number and a transaction number once again.

When the registration key 43 is pushed down at step S22, the deleting unit 16 deletes from the storage unit 30 the transaction data that is to be changed in the current processing (serial number deletion; step S23), and the notification of completion of the serial number deletion is printed/recorded on a receipt and a journal paper with the receipt printer 50 and the journal printer 60, respectively (step S24).

After that, on the basis of the purchase specifics information (registered transaction data) stored as the restoration list, the editing unit 13 edits/restores the purchase specifics as a full display image (see FIG. 4), which is then shown on the main display 70 under control by the display controlling unit 14 (step S25). At this time, in the full screen image, also, the registered transaction data is arranged in the same order as in the information printed on the receipt 200. In addition, as shown in FIG. 4, the price data, which is simplified as "* * *" in the simplified screen image, is fully shown using formal numerical values in the full screen image.

Comparing the information shown on the main display 70 at step S25 with the information printed on the receipt 200, the operator uses the ten-keypad 42 to input correction data for correcting input errors in quantity and prices or to input alteration data as requested by a customer (step S26), and then presses the registration key 43 to confirm the input correction/alteration (step S27). When amending the correction/alteration input at step S26, the operator presses the clear key 44, and input correction/alteration data anew with the ten-key pad 42. After confirmation of the input correction/alteration at step S27, the change unit 17 performs an alteration operation on the registered transaction data according to the correction/alteration input at step S26, and the thus altered transaction data is registered/stored anew in the storage unit 30 by the registering unit 12 (step S28).

In this manner, when an operator performs serial number correction/registered transaction data alteration on the POS terminal 1 of the present embodiment while referring to an issued receipt 200, a purchase specifics screen image (see FIG. 3 and FIG. 4) is edited such that items purchased are arranged therein in the same order as the items are arranged in the printed receipt 200, and a purchase specifics screen image is then shown on the main display 70 of the POS terminal 1.

That is, since the registered transaction data is arranged on the main display 70 of the POS terminal 1 in the same order as the items purchased are arranged in the information printed on the receipt 200, it is easy for an operator to find an object item (target commodity item for data change/correction) in a screen image shown on the main display 70, so that ease of operation and searchability are greatly improved. This facilitates adding, replacing, and returning commodity items as desired by customers, thereby improving customers' convenience.

Further, since the registered transaction data is arranged in a screen image shown on the main display 70 of the POS terminal 1 in the same order as the items purchased are arranged in the information printed on the receipt 200, as shown in FIG. 3, FIG. 4, and FIG. 8, it is possible to minimize the possibility that an operator will choose a wrong item on the main display 70 because of it having a similar item name to that of a target item, thereby preventing occurrence of erroneous operation by the operator with certainty.

[2] Other Modifications

Further, the present invention should by no means be limited to the above-illustrated embodiment, but various changes or modifications may be suggested without departing from the gist of the invention.

Although the commodity code of each commodity item 100 is obtained by reading the barcode 101 provided for the commodity item 100 in the above preferred embodiment, the present invention should by no means be limited to this, and IC tags and radio tags are also applicable in place of such a barcode. In that case, commodity codes are obtained from those tags provided for the commodity item 100.

Further, the functions (all or part of each function) of the retrieving unit 11, registering unit 12, editing unit 13, display controlling unit 14, read-out unit 15, deleting unit 16, and change unit 17, are realized by the CPU 10 (computer) of the POS terminal 1 by executing a predetermined application program (display control program for a cash registering apparatus).

The program is provided as a program recorded in a computer-readable recording medium such as a flexible disc, CD-ROM, CD-R, CD-RW, and DVD. The computer (CPU 10) reads the display control program for a cash registering apparatus recorded in the recording medium and transfers the read-out program to store into an internal or an external storage device. Alternatively, the program can be recorded in a storage device (recording medium) such as a magnetic disc, optical disc, and optical-magnetic disc, so as to be sent to the computer via a communication network.

Here, the computer is defined as a concept including hardware and an OS (Operating System), or hardware operating under control by the OS. In addition, in cases where hardware is operated by an application program alone with no necessity of an OS, the hardware itself is a synonym for "computer". The hardware includes at least a microprocessor such as a CPU, and a means for reading a computer program recorded in a recording medium. The application program that serves as the aforementioned display control program for a cash registering apparatus contains program codes to make the computer function as the retrieving unit 11, registering unit 12, editing unit 13, display controlling unit 14, read-out unit 15, deleting unit 16, and change unit 17. Note that a part of such functions can be realized by an OS and not by an application program.

Further, in addition to the aforementioned flexible discs, CD-ROMs, CD-Rs, CD-RWs, DVDs, magnetic discs, optical discs, and optical-magnetic discs, various kinds of computer-readable media are applicable as a recording medium of the present embodiment: IC cards; ROM cartridges; magnetic tapes; punch cards; internal storages (RAMs, ROMs, and hard discs, for example) and external storages of a computer; and printed materials with printed codes such as barcodes printed thereon.

What is claimed is:

1. A cash registering apparatus, comprising:
a commodity code obtaining unit for obtaining a commodity code of each commodity item purchased;
a retrieving unit for retrieving commodity information corresponding to the commodity code obtained by said commodity code obtaining unit;

a registering unit for registering, as transaction data, the commodity information retrieved by said retrieving unit;

a first editing unit for editing, upon completion of check out of the commodity item, print information to be printed on a receipt, based on a predetermined editing rule and the transaction data registered by said registering unit;

a receipt issuing unit for issuing the receipt, on which the print information edited by said first editing unit is printed;

a display unit for showing on a screen thereof various kinds of data relating to transaction of the commodity item purchased;

a display controlling unit for controlling a display condition on the screen;

a read-out instruction inputting unit for inputting a read-out instruction for reading the registered transaction data upon entry of the transaction data printed on the issued receipt;

a read-out unit for reading the registered transaction data in response to the read-out instruction input from said read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by said read-out unit, said display controlling unit controlling said display unit to show on the screen thereof the purchase specifics screen image edited by said second editing unit.

2. A cash registering apparatus as set forth in claim 1, wherein the following are included as the predetermined editing rule:

(1) the transaction data should be sorted according to commodity categories;

(2) if two or more pieces of the same commodity item are separately read and registered, transaction data thereof should be sorted together to print and/or display as one piece of transaction data, together with the quantity of the commodity item purchased; and (3) if bundle mix pair match items, which are on sale as a package, are separately read and registered, transaction data thereof should be printed and/or displayed consecutively, together with an amount of discount for the package.

3. A cash registering apparatus as set forth in claim 1, wherein said first editing unit doubles as said second editing unit.

4. A cash registering apparatus, comprising:

a commodity code obtaining unit for obtaining a commodity code of each commodity item purchased;

a retrieving unit for retrieving commodity information corresponding to the commodity code obtained by said commodity code obtaining unit;

a registering unit for registering, as transaction data, the commodity information retrieved by said retrieving unit;

a first editing unit for editing, upon completion of check out of the commodity item, print information to be printed on a receipt, based on a predetermined editing rule and the transaction data registered by said registering unit;

a receipt issuing unit for issuing the receipt, on which the print information edited by said first editing unit is printed;

a display unit for showing on a screen thereof various kinds of data relating to transaction of the commodity item purchased;

a display controlling unit for controlling a display condition on the screen;

a read-out instruction inputting unit for inputting a read-out instruction for reading the registered transaction data corresponding to the issued receipt;

a read-out unit for reading the registered transaction data in response to the read-out instruction input from said read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by said read-out unit, wherein, as an initial step, said second editing unit edits a simplified screen image, on which the print information is briefly shown, as the purchase specifics screen image, and said display controlling unit controls said display unit to show on the screen thereof the simplified screen image, and wherein, as a next step, said second editing unit edits and restores a full screen image, on which the print information is fully shown, as the purchase specifics screen image, and said display controlling unit controls said display unit to show on the screen thereof the full screen image.

5. A cash registering apparatus as set forth in claim 4, further comprising:

a delete instruction inputting unit for inputting a delete instruction for deleting the registered transaction data after display of the simplified screen image on said display unit; and a deleting unit for deleting the registered transaction data in response to the delete instruction input from said delete instruction inputting unit, in response to the delete instruction input from said delete instruction inputting unit, said second editing unit editing and restoring the full screen image, and said display controlling unit controlling said display unit to show on the screen thereof the full screen image.

6. A cash registering apparatus as set forth in claim 5, further comprising a change unit for performing a desired change operation to the registered transaction data shown in the full screen image displayed on said display unit, said registering unit registering anew the transaction data changed by said change unit.

7. A cash registering apparatus, comprising:

a commodity code obtaining unit for obtaining a commodity code of each commodity item purchased;

a retrieving unit for retrieving commodity information corresponding to the commodity code obtained by said commodity code obtaining unit;

a registering unit for registering, as transaction data, the commodity information retrieved by said retrieving unit;

a first editing unit for editing, upon completion of check out of the commodity item, print information to be printed on a receipt, based on a predetermined editing rule and the transaction data registered by said registering unit;

a receipt issuing unit for issuing the receipt, on which the print information edited by said first editing unit is printed;

a display unit for showing on a screen thereof various kinds of data relating to transaction of the commodity item purchased;

a display controlling unit for controlling a display condition on the screen;

a read-out instruction inputting unit for inputting a read-out instruction for reading the registered transaction data corresponding to the issued receipt;

a read-out unit for reading the registered transaction data in response to the read-out instruction input from said read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by said read-out unit, wherein said registering unit registers the transaction data and transaction identifying information which identifies the transaction data, in association with each other, wherein said receipt issuing unit issues the receipt, on which not only the print information but also the transaction identifying information associated with the transaction data is printed, wherein said read-out instruction inputting unit inputs not only the read-out instruction but also the transaction identifying information printed on the receipt, and wherein said read-out unit reads the transaction data, associated with the transaction identifying information input from said read-out instruction inputting unit, as the registered transaction data.

8. A cash registering apparatus as set forth in claim 7, wherein the transaction identifying information is an apparatus number identifying the cash registering apparatus on which the receipt was issued and a serial number given to every transaction made on the cash registering apparatus.

9. A cash registering system, comprising:

a commodity information database storing commodity information of each commodity item and commodity code of the commodity item in association with each other;

a commodity code obtaining unit for obtaining a commodity code of each commodity item purchased;

a retrieving unit for retrieving, from said commodity information database, commodity information corresponding to the commodity code obtained by said commodity code obtaining unit;

a storing unit for storing transaction data therein;

a registering unit for registering and storing, as the transaction data, the commodity information retrieved by said retrieving unit in said storing unit;

a first editing unit for editing, upon completion of check out of the commodity item, print information to be printed on a receipt, based on a predetermined editing rule and the transaction data registered and stored in said storing unit by said registering unit;

a receipt issuing unit for issuing the receipt, on which the print information edited by said first editing unit is printed;

a display unit for showing on a screen thereof various kinds of data relating to transaction of the commodity item purchased;

a display controlling unit for controlling a display condition on the screen;

a read-out instruction inputting unit for inputting a read-out instruction for reading the registered transaction data upon entry of the transaction data printed on the issued receipt from said storing unit;

a read-out unit for reading the registered transaction data from said storing unit in response to the read-out instruction input from said read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read from said storing unit by said read-out unit, said display controlling unit controlling said display unit to show on the screen thereof the purchase specifics screen image edited by said second editing unit.

10. A cash registering system as set forth in claim 9, wherein said first editing unit doubles as said second editing unit.

11. A cash registering system, comprising:

a commodity code obtaining unit for obtaining a commodity code of each commodity item purchased;

a retrieving unit for retrieving commodity information corresponding to the commodity code obtained by said commodity code obtaining unit;

a registering unit for registering, as transaction data, the commodity information retrieved by said retrieving unit;

a first editing unit for editing, upon completion of check out of the commodity item, print information to be printed on a receipt, based on a predetermined editing rule and the transaction data registered by said registering unit;

a receipt issuing unit for issuing the receipt, on which the print information edited by said first editing unit is printed;

a display unit for showing on a screen thereof various kinds of data relating to transaction of the commodity item purchased;

a display controlling unit for controlling a display condition on the screen;

a read-out instruction inputting unit for inputting a read-out instruction for reading the registered transaction data corresponding to the issued receipt;

a read-out unit for reading the registered transaction data in response to the read-out instruction input from said read-out instruction inputting unit; and a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by said read-out unit, wherein, as an initial step, said second editing unit edits a simplified screen image, on which the print information is briefly shown, as the purchase specifics screen image, and said display controlling unit controls said display unit to show on the screen thereof the simplified screen image, and wherein, as a next step, said second editing unit edits and restores a full screen image, on which the print information is fully shown, as the purchase specifics screen image, and said display controlling unit controls said display unit to show on the screen thereof the full screen image.

12. A cash registering system as set forth in claim 11, further comprising:
   a delete instruction inputting unit for inputting a delete instruction for deleting the registered transaction data from said storing unit after display of the simplified screen image on said display unit; and
   a deleting unit for deleting the last-mentioned registered transaction data from said storing unit in response to the delete instruction input from said delete instruction inputting unit,
   in response to the delete instruction input from said delete instruction inputting unit, said second editing unit editing and restoring the full screen image, and said display controlling unit controlling said display unit to shown on the screen thereof the full screen image.

13. A cash registering system as set forth in claim 12, wherein said first editing unit doubles as said second editing unit.

14. A cash registering system as set forth in claim 11, wherein said first editing unit doubles as said second editing unit.

15. A computer-readable recording medium which records therein a display control program for a cash registering apparatus including: a commodity code obtaining unit for obtaining a commodity code of each commodity item purchased; a retrieving unit for retrieving commodity information corresponding to the commodity code obtained by the commodity code obtaining unit; a registering unit for registering, as transaction data, the commodity information retrieved by the retrieving unit; a first editing unit for editing, upon completion of check out of the commodity item, print information to be printed on a receipt, based on a predetermined editing rule and the transaction data registered by the registering unit; a receipt issuing unit for issuing the receipt, on which the print information edited by the first editing unit is printed; and a display unit for showing on a screen thereof various kinds of data relating to transaction of the commodity item purchased, said display control program instructing a computer to function as a display controlling unit for controlling a display condition on the screen,
   wherein said display control program instructs the computer to function as the following:
   a read-out unit for reading, in response to a read-out instruction for reading the registered transaction data upon entry of the transaction data printed on the issued receipt, the registered transaction data; and
   a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by the read-out unit, and
   wherein said display control program instructs the computer to control the display unit to show on the screen thereof the purchase specifics screen image edited by the second editing unit.

16. A computer-readable recording medium as set forth in claim 15, wherein said display control program instructs the computer to double as the first and the second editing unit.

17. A computer-readable recording medium having a display control program recorded therein for a cash registering apparatus including a commodity code obtaining unit obtaining a commodity code of each commodity item purchased, a retrieving unit retrieving commodity information corresponding to the commodity code obtained by the commodity code obtaining unit; a registering unit registering the commodity information retrieved by the retrieving unit as transaction data, a first editing unit editing, upon completion of check out of the commodity item, print information to be printed on a receipt, based on a predetermined editing rule and the transaction data registered by the registering unit, a receipt issuing unit issuing the receipt, on which the printed information edited by the first editing unit is printed, and
   a display unit showing on a screen thereof various kinds of data relating to transaction of the commodity item purchased, said display control program instructing a computer to function as a display controlling unit for controlling a display condition on the screen,
   wherein said display control program instructs the computer to execute functions including:
   a read-out unit for reading, in response to a read-out instruction for reading the registered transaction data corresponding to the issued receipt, the registered transaction data; and
   a second editing unit for editing a purchase specifics screen image in such a manner that the commodity items purchased are arranged on the purchase specifics screen image in the same order as the commodity items are arranged in the print information printed on the issued receipt, based on the predetermined editing rule and the registered transaction data read by the read-out unit,
   wherein said display control program instructs the computer, as a next step, to control the second editing unit to edit and restore a full screen image, on which the printed information is fully shown, as the purchase specifics screen image, and to control the display unit to show on the screen thereof the full screen image.

18. A computer-readable recording medium as set forth in claim 17, wherein said display control program instructs the computer to control, in response to a delete instruction, which is input after display of the simplified screen image on the display unit, for deleting the registered transaction data from the storing unit, the second editing unit to edit and restore the full screen image, and also the display unit to show on the screen thereof the full screen image.

19. A computer-readable recording medium as set forth in claim 18, wherein said display control program instructs the computer to double as the first and the second editing unit.

20. A computer-readable recording medium as set forth in claim 17, wherein said display control program instructs the computer to double as the first and the second editing unit.

* * * * *